Nov. 7, 1950 R. D. HICKOK 2,529,337
INDICATING DIAL FOR PHOTOELECTRIC LIGHT METERS
Filed Feb. 15, 1947

INVENTOR
ROBERT D. HICKOK
By Hyde, Meyer, Baldwin & Doran
ATTORNEYS

Patented Nov. 7, 1950

2,529,337

UNITED STATES PATENT OFFICE 2,529,337

INDICATING DIAL FOR PHOTOELECTRIC LIGHT METERS

Robert D. Hickok, Bratenahl, Ohio, assignor to Cleveland Patents, Incorporated, Cleveland, Ohio, a corporation of Ohio Application February 15, 1947, Serial No. 728,914

5 Claims. (Cl. 235—64.3)

1

The invention relates to photographic exposure meters and more particularly to meters in which a pointer moves to various positions over a scale, the pointer being responsive to variations in the intensity of light striking a light sensitive cell of the photoelectric type.

The invention is more particularly concerned with the character of the scales associated with the pointer, and also with the angular extent of the scales as determined from the axis of swing of the pointer as a center.

In meters of the photoelectric type heretofore available, the scale indicating light intensity or other factors did not occupy a circumferential extent of more than 180 degrees of dial face, and actually represented an arc of not more than one hundred degrees with reference to the axis of swing of an indicating pointer, since such pointer was usually offset from the dial center. This angular limitation restricted the actual length of the scale, and made it difficult to provide an adequate number of marked scale increments, or sub-divisions of the complete scale.

Further, in previously available photoelectric meters the complete dial was usually used, the top 180 degrees carrying one or more scales for different factors, and the bottom 180 degrees likewise carrying one or more scales for other factors, these latter scales being of course arcuately reversed. Sometimes even the rear of the meter housing carried fixed or movable reference scales or tables. This was a fruitful source of confusion in reading the meter, particularly when dial rotation or manipulation was required as a pre-requisite to finding the ultimate information desired.

An object of the invention is to provide novel and improved scale means for an exposure meter of the photoelectric type, the light intensity indicating pointer being swingable circumferentially through a scale span of materially more than one hundred degrees around a center coincident with the axis of rotation of the indicating pointer.

A further object of the invention is to provide novel and improved scale means of the character described wherein all indicating scales including those for film speed, shutter speed, and iris diaphragm opening (generally termed lens stop opening) extend concentrically in adjacent and mutually registrable parallel arcs through a segmental span of materially more than one hundred degrees around a center coincident with the axis of rotation of the indicating pointer.

A further object of the invention is to provide novel and improved scale means for a photo-

2 electric exposure meter, whereon the indicated scale divisions can be of greater circumferential extent than quantitatively comparable scale divisions on other meters, by reason of the greater total circumferential angular span of the complete scale as aforesaid.

A further object of the invention is to provide novel and improved scale means for a photoelectric exposure meter wherein the increased scale length permits the use of an increased number of scale markings, and consequently permits greater precision in actually indicating sub-divisions without the necessity of interpolation, or estimation of the same.

A further object of the invention is to provide novel and improved scale means for a photoelectric exposure meter wherein all necessary scales are carried on juxtaposed concentric strips of approximately the same arcuate extent, and of the same orientation with respect to the observer, so that any and all scales are more easily readable than in light meters wherein a number of end-abutting scale strips occupy the complete circumferential periphery of the dial face.

Other objects and advantages will be apparent from the following description, in conjunction with the accompanying drawings illustrating one embodiment of the invention, in which Fig. 1 is a top plan view of a meter housing and dial, the showing being somewhat larger than the actual size of a conventional meter.

The light sensitive and light responsive meter parts such as a photoelectric cell, magnets, D'Arsonval coil, and associated working elements may be of any suitable design, although it will be apparent as the description proceeds that the indicating dial here shown is especially adapted for use with a so-called "two hundred and fifty degree swing" meter movement of the particular structure more fully described and illustrated in my co-pending application, Serial No. 728,913, filed concurrently herewith. For simplicity therefore I show only the indicating dial, a conventional pointer, and fragmentary portions of the pivot axis, the coil, and the core.

Figure 2:
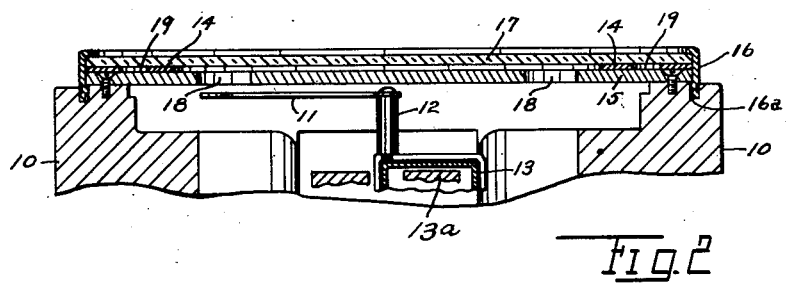
Fig. 2 is a sectional view of the dial face, taken approximately on the line 2—2 of Fig. 1.

Reference character 10 indicates a housing suitable for the reception of the aforesaid light sensitive and light responsive parts. An indicating pointer 11 swings on an axis 12 responsive to the movement of a D'Arsonval coil 13 around a core 13a in a magnetic field, the coil and core being indicated only fragmentarily (Fig. 2).

Carried on the housing, and disposed above the pointer 11 is an indicating dial comprising an annulus 14 and a disk 15 which are superposed, and concentric with the pointer axis. The disk 15 in the embodiment shown is fixed with respect to the housing 10. The annulus 14 is slidably rotatable above the disk 15 by means of a rotatable retaining ring 16. A glass cover plate 17 is usually supplied, and is also rotatable with ring 16. The annulus 14 may be adhesively united to the glass 17, so that glass, annulus, and ring rotate as a unit. The ring is slidably rotatable in a groove 16a in housing 10, but is ordinarily not removable.

The disk 15 is provided with an arcuate slot 18 concentric with the axis of rotation of pointer 11, the slot permitting observation of the pointer position. The annulus 14 is provided with an arcuate slot 19, also concentric with the axis of rotation of pointer 11. The slot 19 permits observation of an underlying arcuate portion of disk 15. The disk 15 and the annulus 14 carry correlatable scales, the registering relationships between which may be changed by relative movement between the disk and annulus. Movement of pointer 11 responsive to light striking the photoelectric cell (not shown) evaluates an additional factor, namely, the intensity of the light being measured and indicated.

The character and relationship of the several scales will now be more specifically described. It is understood, of course, that the user of a photoelectric light meter is primarily interested in determining the proper combination of shutter speed and lens stop aperture to be used in making a photographic exposure, having due regard for the existing light intensity. It is further understood that it is highly desirable that the meter be easy to read and that required meter manipulations be reduced to an absolute minimum, so that the photographer may concentrate on the taking of the picture.

Disc 15 carries thereon an arcuate strip 20 of scale indicia for time increments, immediately beneath and registrable with slot 19, and representing camera shutter speeds in seconds and fractions thereof. The individually marked scale divisions, such as "1," "¾," "½" etc., are alternately black and white, for ease in selection. The designations "16FPS" and "32FPS" on the same scale refer to "frames per second," a marking significant to users of motion picture cameras.

For convenience this strip 20 may be termed the time scale. Since it is carried on the disc 15 which is fixed with respect to the housing, and with respect to the pointer swing, it will be obvious that motion of the pointer forwardly or rearwardly along the time scale likewise indicates progressive increase or decrease of light intensity, and that the said time scale might also have been marked with progressive indicia representing light value units. As will appear such marking is unnecessary for normal use of the present meter since the pointer indicates directly on another associated scale the ultimate information usually desired. It may be borne in mind however that the marked time increments on the time scale are actually inversely proportional to corresponding variations in light intensity. For example, the markings "4" and "2" on the time scale, represent four seconds and two seconds shutter speed, and likewise indicate that when the pointer moves from "4" to "2" the actinic value of the light has doubled, thereby permitting the exposure time to be halved.

One distinct advantage of the present indicating dial is that no separate light intensity scale is required, its function being combined with, and integrated in, the time scale. Troublesome translation of light values from one scale to another is thereby avoided.

Annulus 14 carries thereon two arcuate strips of scale indicia 21 and 22, one strip on each side of the slot 19, so as to be mutually registrable with the time scale 20 above mentioned. Scale 21 indicates film sensitivity, usually termed film speed, the markings conforming to any accepted standard. More than one such set of markings may of course be juxtaposed on the film speed scale 21. Scale 22 indicates lens aperture, the markings conforming to any accepted standard, such as the "f" stops commonly used on the controls for present day iris diaphragms for camera lenses.

It will be observed that the three scales 20, 21 and 22 are juxtaposed in three arcuate strips, concentric with the axis 12 of the pointer swing, and all uniformly oriented for ease in comparison and scale reading, and that they extend around a major portion of the meter dial to an angular extent of approximately two hundred and fifty degrees. It will be further observed that the remaining angular span of the dial contains no scales or other necessary reference data, and, as will soon appear, the meter is of the "direct reading" type, the pointer indicating the ultimate information directly, without further manual operation or mental calculation.

Figure 3:
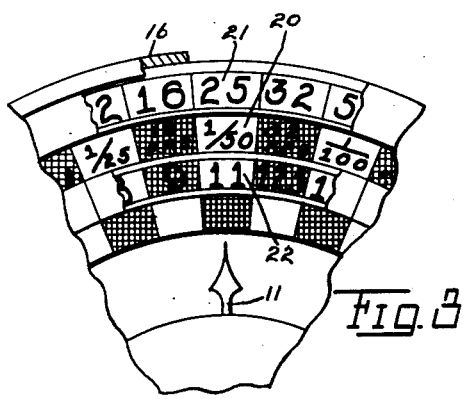
Fig. 3 is a fragmentary portion, somewhat enlarged, of the dial face shown in Fig. 1, the dial pointer being in a different position.

In operation the ring 16 is first turned until the sensitivity value of the film being used, for example "25" on scale 21, Fig. 3 is in registry with the shutter speed intended to be used, for example one-fiftieth of a second on scale 20. The light acceptance aperture 25 of the meter is then pointed at the object or zone to be photographed. Pointer 11 thereupon swings to a position corresponding to the light intensity of the angular field scanned by aperture 25. In so doing the pointer also indicates, on scale 22, the particular lens stop opening to be used to obtain the proper exposure in view of the existing light intensity, for example f stop 11.

The ease and simplicity of use of the meter scale just described will be immediately apparent. Having determined the desired shutter speed, and registered it with the film sensitivity value, by suitable movement of the annulus, an operation which may usually be performed well in advance of the taking of the picture, for example when the camera is loaded with film, there is no further manual operation, or mental calculation, or meter manipulation required other than to actually point the meter at the object to be photographed, or the brightness of which is to be determined. If the user desires to select the lens stop opening in advance, and have the pointer indicate the shutter speed, a dial may be substituted in which scales 20 and 22 are transposed.

Figure 1:
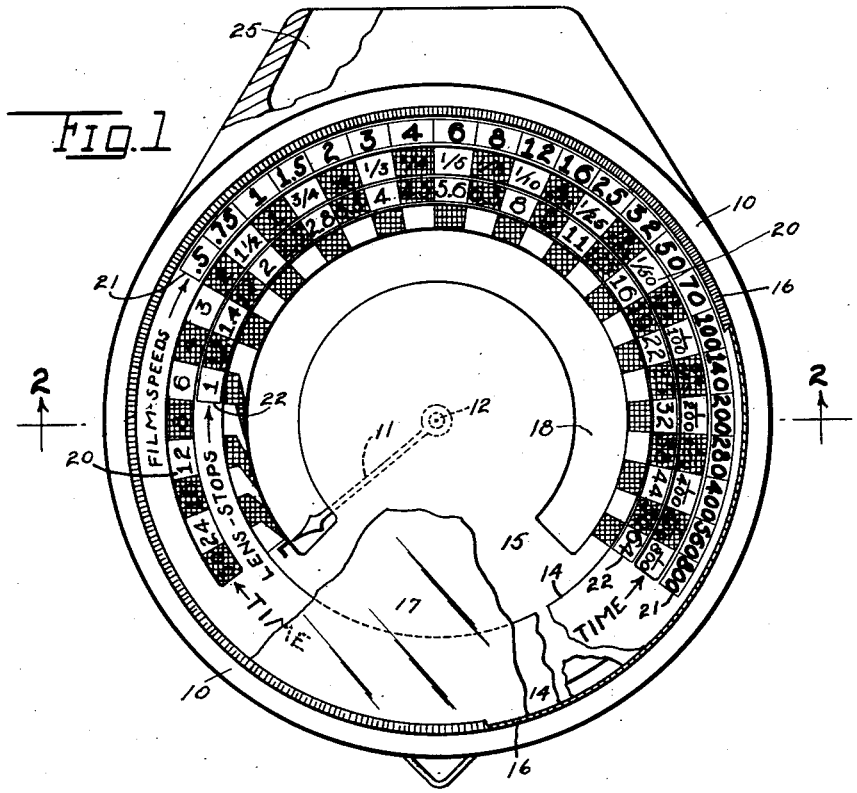

The extension of the scale strips to an angular span of more than two hundred degrees permits the use of a much greater number of individually marked scale increments, so that whereas it was formerly necessary to estimate certain intermediate shutter speeds or lens stops, such intermediate speeds and stops may now be actually marked, plainly seen, and definitely indicated as will be evident from an examination of Fig. 1.

Certain advantages of the present invention may of course be realized, though to a somewhat less obvious extent, with meters wherein the pointer swing is less than two hundred and fifty degrees, but more than the conventional ninety or one hundred degrees.

What I claim is:

1. An indicating dial for a light meter of the character described wherein a pointer swings on a pivotal axis responsive to variations in light intensity, said dial including a first scale with which said pointer is registrable, and sub-divided into increments representing time periods, and proportional to respective quantitative increments of light intensity, a second scale subdivided into increments representing respective lens stop openings, and a third scale movable as a unit with said second scale, and subdivided into increments representing photographic film sensitivity means for producing relative movement between said first and second scales, all three said scales being segmental in character and being juxtaposed in three arcs of successively decreasing radii, all said arcs being concentric with respect to said pivotal axis, each said scale extending around a major portion of the circumferential extent of the dial.

2. An indicating dial for a light meter of the character described wherein a pointer swings on a pivotal axis responsive to variations in light intensity, said dial including a first scale with which said pointer is registrable, and sub-divided into increments representing time periods, and proportional to respective quantitative increments of light intensity, a second scale subdivided into increments representing respective lens stop openings, and a third scale movable as a unit with said second scale, and sub-divided into increments representing photographic film sensitivity means for producing relative movement between said first and second scales, all three said scales being segmental in character and being juxtaposed in three arcs of successively decreasing radii, all said arcs being concentric with respect to said pivotal axis, each said scale extending for approximately two hundred and fifty degrees around said dial with relation to the axis of swing of said pointer.

3. An indicating dial for a light meter of the character described wherein a pointer swings on a pivotal axis responsive to variations in light intensity, said dial comprising superposed upper and lower scale carrying members, means for permitting relative rotation between said members around a center coincident with said pivotal axis, said lower scale carrying member having on its upper surface an arcuate time scale graduated in seconds and fractions thereof, said upper scale carrying member having therein an arcuate slot registrable with said time scale whereby said time scale is visible through said slot, said upper scale carrying member having on its upper surface a lens stop scale of arcuate form adjacent one edge of said slot, and a film sensitivity scale of arcuate form adjacent the other edge of said slot, said lens stop scale and said film sensitivity scale being immovable with respect to each other but both being movable with respect to said time scale, all three said scales being registrable with pointer swing and being concentric with respect to the said pivotal axis, and the angular extent of each said scale being substantially in excess of one hundred degrees with respect to said axis.

4. An indicating dial for a light meter of the character described wherein a pointer swings on a pivotal axis responsive to variations in light intensity, said dial comprising superposed upper and lower scale carrying members, means for permitting relative rotation between said members around a center coincident with said pivotal axis, said lower scale carrying member having on its upper surface an arcuate time scale graduated in seconds and fractions thereof, said upper scale carrying member having therein an arcuate slot registrable with said time scale whereby said time scale is visible through said slot, said upper scale carrying member having on its upper surface a lens stop scale of arcuate form adjacent one edge of said slot, and a film sensitivity scale of arcuate form adjacent the other edge of said slot, said lens stop scale and said film sensitivity scale being immovable with respect to each other but both being movable with respect to said time scale, all three said scales being registrable with pointer swing and being concentric with respect to the said pivotal axis, each said scale extending around a major portion of the circumferential extent of the dial.

5. An indicating dial for a light meter of the character described wherein a pointer swings on a pivotal axis responsive to variations in light intensity, said dial having three juxtaposed arcuate scale strips each registrable with pointer swing and denoting, respectively, time indicia, film sensitivity indicia, and lens stop indicia, the film sensitivity indicia scale and time indicia scale being movable with respect to each other to vary the registrable relationship between their respective indicia, all three said scales lying in parallel strips concentric with respect to said pivotal axis, and being similarly oriented with respect to a single observing position so as to be easily observable and readable from said position, each said scale extending around a major portion of the circumferential extent of the dial, said pointer being adapted to directly indicate the lens stop to be used for the existing light intensity when the sensitivity index of the film being used is placed in registration with the specific shutter speed time index.

ROBERT D. HICKOK.

REFERENCES CITED

The following references are of record in the file of this patent:

UNITED STATES PATENTS

| Number | Name | Date |
|---|---|---|
| 2,147,999 | Tonnies | Feb. 21, 1939 |
| 2,394,835 | Arant | Feb. 12, 1946 |
| 2,421,504 | Hickok | June 3, 1947 |

FOREIGN PATENTS

| Number | Country | Date |
|---|---|---|
| 430,073 | Great Britain | June 4, 1935 |